United States Patent
Jafry et al.

(10) Patent No.: US 9,363,711 B2
(45) Date of Patent: Jun. 7, 2016

(54) USER EXPERIENCES DURING CALL HANDOVERS ON A HYBRID TELECOMMUNICATIONS NETWORK

(71) Applicant: Microsoft Corporation, Redmond, WA (US)

(72) Inventors: Mansoor Jafry, Kirkland, WA (US); Jason Nelson, Redmond, WA (US); Jeffrey Fong, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/247,020

(22) Filed: Apr. 7, 2014

(65) Prior Publication Data

US 2015/0289168 A1 Oct. 8, 2015

(51) Int. Cl.
*H04W 36/00* (2009.01)
*H04W 36/14* (2009.01)
*H04M 1/253* (2006.01)
*H04M 1/725* (2006.01)

(52) U.S. Cl.
CPC .......... *H04W 36/0005* (2013.01); *H04W 36/14* (2013.01); *H04M 1/2535* (2013.01); *H04M 1/72519* (2013.01)

(58) Field of Classification Search
USPC ......... 370/331, 328, 329, 455, 436, 437, 438, 370/439, 440, 441, 442, 443, 444
See application file for complete search history.

(56) References Cited

U.S. PATENT DOCUMENTS 6,148,206 A 11/2000 Karanja et al.
6,335,927 B1 1/2002 Elliott et al.

(Continued)

FOREIGN PATENT DOCUMENTS

CN 101656922 A 2/2010
EP 1432219 A1 6/2004

(Continued)

OTHER PUBLICATIONS

"International Search Report and Written Opinion Issued in PCT Patent Application No. PCT/US2015/020848", Mailed Date: Jun. 9, 2015, (11 Pages total).

(Continued)

*Primary Examiner* — Vladimir Magloire
*Assistant Examiner* — Sayed T Zewari
(74) *Attorney, Agent, or Firm* — Judy Yee; Micky Minhas

(57) ABSTRACT

A mobile device capable of connecting to a hybrid telecommunications network using different connection types is configured to implement various mitigations to audio disruptions that may occur during the performance of a call handover between connections. Negligible audio disruptions that do not impact the conversation between parties to the call are not mitigated at all, while relatively short audio disruptions are mitigated in a passive manner by playing background white noise or comfort sounds on the mobile device. Relatively longer duration disruptions are dealt with using more active mitigations in which audio tones are played and the mobile device's graphical user interface (GUI) is configured to indicate to the user that a handover is in progress. Audio disruptions which are irrecoverable are handled by disconnecting the call and providing options through the GUI to either call the other party back, send a message, or set a callback reminder.

19 Claims, 13 Drawing Sheets

(56) References Cited

U.S. PATENT DOCUMENTS

| | | | |
|---|---|---|---|
| 6,343,220 B1 | 1/2002 | Van Der Salm | |
| 6,490,449 B1 | 12/2002 | Thibert et al. | |
| 6,518,957 B1* | 2/2003 | Lehtinen | G06F 1/1626 |
| | | | 345/168 |
| 6,763,226 B1 | 7/2004 | McZeal, Jr. | |
| 7,010,002 B2 | 3/2006 | Chow et al. | |
| 7,110,750 B2 | 9/2006 | Oishi et al. | |
| 7,411,911 B2 | 8/2008 | Huotari et al. | |
| 7,483,984 B1 | 1/2009 | Jonker et al. | |
| 7,631,270 B2 | 12/2009 | Cunningham et al. | |
| 7,697,479 B2 | 4/2010 | Metke et al. | |
| 7,706,291 B2 | 4/2010 | Luft et al. | |
| 7,746,989 B2 | 6/2010 | Mazor | |
| 7,796,998 B1 | 9/2010 | Zellner et al. | |
| 7,830,863 B2 | 11/2010 | Biage et al. | |
| 7,835,751 B2 | 11/2010 | Ibe | |
| 7,894,807 B1 | 2/2011 | Drennan | |
| 7,903,794 B1 | 3/2011 | Bales et al. | |
| 7,986,943 B2 | 7/2011 | Bumiller | |
| 7,995,565 B2 | 8/2011 | Buckley et al. | |
| 8,000,710 B2 | 8/2011 | Jagadeesan et al. | |
| 8,032,122 B2 | 10/2011 | Sigmund et al. | |
| 8,126,465 B2 | 2/2012 | Lu et al. | |
| 8,155,084 B2 | 4/2012 | Long et al. | |
| 8,254,986 B2 | 8/2012 | Russell | |
| 8,976,950 B2 | 3/2015 | Kramarenko | |
| 9,001,787 B1 | 4/2015 | Conant | |
| 2002/0059453 A1 | 5/2002 | Eriksson et al. | |
| 2002/0146000 A1 | 10/2002 | Jonsson et al. | |
| 2003/0231759 A1 | 12/2003 | Bedingfield, Sr. et al. | |
| 2004/0047339 A1 | 3/2004 | Wang et al. | |
| 2004/0121761 A1 | 6/2004 | Tripathy et al. | |
| 2004/0203607 A1 | 10/2004 | Satapathy | |
| 2004/0240430 A1 | 12/2004 | Lin et al. | |
| 2005/0070291 A1 | 3/2005 | Shi | |
| 2005/0186960 A1 | 8/2005 | Jiang | |
| 2005/0249196 A1 | 11/2005 | Ansari et al. | |
| 2005/0286466 A1 | 12/2005 | Tagg et al. | |
| 2006/0029049 A1 | 2/2006 | Kobayashi et al. | |
| 2006/0030357 A1 | 2/2006 | Jiang | |
| 2006/0045069 A1 | 3/2006 | Zehavi et al. | |
| 2006/0121902 A1 | 6/2006 | Jagadeesan et al. | |
| 2006/0133582 A1 | 6/2006 | McCulloch | |
| 2006/0187900 A1 | 8/2006 | Akbar | |
| 2006/0198360 A1 | 9/2006 | Biage et al. | |
| 2006/0245413 A1 | 11/2006 | Skalecki et al. | |
| 2007/0070948 A1 | 3/2007 | Kezys et al. | |
| 2007/0081518 A1 | 4/2007 | Jain et al. | |
| 2007/0083918 A1 | 4/2007 | Pearce et al. | |
| 2007/0086584 A1 | 4/2007 | Rossini | |
| 2007/0197224 A1 | 8/2007 | Winkler | |
| 2007/0206568 A1 | 9/2007 | Silver | |
| 2007/0206571 A1 | 9/2007 | Silver | |
| 2007/0217366 A1 | 9/2007 | Sagi et al. | |
| 2007/0263613 A1 | 11/2007 | Hara et al. | |
| 2008/0026732 A1 | 1/2008 | Goldfarb | |
| 2008/0032695 A1 | 2/2008 | Zhu et al. | |
| 2008/0056235 A1 | 3/2008 | Albina et al. | |
| 2008/0096560 A1 | 4/2008 | Felske et al. | |
| 2008/0102815 A1 | 5/2008 | Sengupta et al. | |
| 2008/0113683 A1 | 5/2008 | Paas | |
| 2008/0123625 A1 | 5/2008 | Buckley | |
| 2008/0192900 A1 | 8/2008 | Liu | |
| 2008/0232352 A1 | 9/2008 | Terrill et al. | |
| 2008/0242299 A1 | 10/2008 | Edwards | |
| 2008/0254797 A1 | 10/2008 | Achtari et al. | |
| 2008/0279176 A1* | 11/2008 | Cheng | H04L 12/66 |
| | | | 370/352 |
| 2009/0003316 A1 | 1/2009 | Lee | |
| 2009/0086937 A1 | 4/2009 | Horn et al. | |
| 2009/0097450 A1 | 4/2009 | Wallis et al. | |
| 2009/0141682 A1 | 6/2009 | Zou et al. | |
| 2009/0191876 A1 | 7/2009 | Jain et al. | |
| 2009/0233602 A1 | 9/2009 | Hughes | |
| 2009/0249247 A1 | 10/2009 | Tseng | |
| 2009/0285175 A1 | 11/2009 | Nix | |
| 2009/0305732 A1* | 12/2009 | Marcellino | H04L 12/587 |
| | | | 455/466 |
| 2010/0080128 A1 | 4/2010 | Hovey et al. | |
| 2010/0124897 A1 | 5/2010 | Edge | |
| 2010/0172323 A1 | 7/2010 | Rexhepi et al. | |
| 2010/0172483 A1 | 7/2010 | Weiner | |
| 2010/0226339 A1 | 9/2010 | Stephenson et al. | |
| 2010/0246785 A1* | 9/2010 | Wang | H04M 1/72583 |
| | | | 379/88.23 |
| 2010/0285785 A1 | 11/2010 | Wang | |
| 2010/0304724 A1 | 12/2010 | Lawler | |
| 2010/0316199 A1 | 12/2010 | Martin, II | |
| 2011/0044293 A1* | 2/2011 | Nagasawa | H04M 1/2535 |
| | | | 370/332 |
| 2011/0103576 A1 | 5/2011 | Partington et al. | |
| 2012/0014273 A1 | 1/2012 | Notton et al. | |
| 2012/0115490 A1 | 5/2012 | Nicholson et al. | |
| 2012/0120914 A1 | 5/2012 | Sedlacek et al. | |
| 2012/0196644 A1 | 8/2012 | Scherzer et al. | |
| 2012/0236868 A1 | 9/2012 | Yan | |
| 2012/0296963 A1 | 11/2012 | Lu | |
| 2013/0007286 A1 | 1/2013 | Mehta et al. | |
| 2013/0035138 A1 | 2/2013 | Abbott | |
| 2013/0064106 A1 | 3/2013 | Sylvain | |
| 2013/0067056 A1 | 3/2013 | Purkayastha et al. | |
| 2013/0100887 A1 | 4/2013 | Kim | |
| 2013/0196706 A1 | 8/2013 | Patel et al. | |
| 2013/0331101 A1 | 12/2013 | Thomas et al. | |
| 2014/0068314 A1 | 3/2014 | Kim | |
| 2014/0070991 A1 | 3/2014 | Liu | |
| 2014/0254491 A1 | 9/2014 | Lindholm et al. | |
| 2014/0269495 A1 | 9/2014 | Frantz | |
| 2015/0038156 A1 | 2/2015 | Kilpatrick, II | |
| 2015/0065134 A1 | 3/2015 | Vandemoere et al. | |

FOREIGN PATENT DOCUMENTS

| | | |
|---|---|---|
| EP | 1519526 A1 | 3/2005 |
| EP | 1858270 A1 | 11/2007 |
| EP | 2009887 A1 | 12/2008 |
| EP | 2096843 A2 | 9/2009 |
| EP | 2112849 A2 | 10/2009 |
| EP | 2271171 A1 | 1/2011 |
| JP | 2002-262336 A | 9/2002 |
| WO | 0013454 A1 | 3/2000 |
| WO | 02/11475 A1 | 2/2002 |
| WO | 2004/057845 A1 | 7/2004 |
| WO | 2005055626 A1 | 6/2005 |
| WO | 2005101785 A1 | 10/2005 |
| WO | 2008110664 A1 | 9/2008 |
| WO | 2009040645 A1 | 4/2009 |
| WO | 2013025698 A1 | 2/2013 |

OTHER PUBLICATIONS

"International Preliminary Report on Patentability Issued in PCT Application No. PCT/US2014/068685", Mailed Date: Jun. 26, 2015, (6 Pages total).

"International Search Report & Written Opinion Received for PCT Application No. PCT/US2015/023453", Mailed Date: Jun. 22, 2015, (12 Pages total).

Whitwam, Ryan, "Republic Wireless Moto X Review: A Great Deal with Very Few Compromises", Published on: Dec. 4, 2013, Available at: http://www.androidpolice.com/2013/12/03/republic-wireless-moto-x-review-a-great-deal-with-very-few-compromises/ (12 pages total).

Bellavista, et al., "An IMS Vertical Handoff Solution to Dynamically Adapt Mobile Mulitmedia Services", IEEE Symposium on Computers and Communications, Jul. 6, 2008, pp. 764-771, 8 pages.

Perenson, Melissa, "Republic Wireless: Everything You Need to Know", Published on: Aug. 28, 2013, Available at: http://blog.laptopmag.com/republic-wireless-faq (6 pages total).

"ip4calls-iTelHybridDialer", Published on: Jul. 17, 2013, Available at: https://play.google.com/store/apps/details?id=com.revesoft.hybriddialer.first_united_international_general_trading_.ip4calls&hl=en (2 pages total).

(56) References Cited

OTHER PUBLICATIONS

Whitwam, Ryan, "A Google Engineer Explains Why KitKat has White Status Bar Icons and Only Shows Connectivity in Quick Settings", Published on: Nov. 18, 2013, Available at: http://www.androidpolice.com/2013/11/18/a-google-engineer-explains-why-kitkat-has-white-status-bar-icons-and-only-shows-connectivity-in-quick-settings/ (9 pages total).
Ormond, et al., "Dynamic Network Selection in Wireless LAN/MAN Heterogeneous Networks", In Proceedings of Mobile WiMAX: Towards Broadband Wireless Metropolitan Area Networks, Dec. 10, 2007, (60 pages total).
Alkhwlani, et al., "Access Network Selection using Combined Fuzzy Control and MCDM in Heterogeneous Networks", In Proceedings of International Conference on Computer Engineering & Systems, Nov. 27, 2007, (6 pages total).
Porjazoski, et al., "Radio Access Technology Selection in Heterogeneous Wireless Networks Based on Service Type and User Mobility", In Proceedings of 18th International Conference on Systems, Signals and Image Processing, Jun. 16, 2011, (4 pages total).
Adamopoulou, et al., "Intelligent Access Network Selection in Heterogeneous Networks", In 2nd International Symposium on Wireless Communication Systems, Sep. 7, 2005, (5 pages total).
Alkhawlani, et al., "Hybrid Approach for Radio Network Selection in Heterogeneous Wireless Networks", In International Journal of Advanced Science and Technology, vol. 44, Jul. 2012, (16 pages total).
Cai, et al., "Dynamic and User-Centric Network Selection in Heterogeneous Networks", In Proceedings of IEEE International Performance, Computing, and Communications Conference, Apr. 11, 2007, (7 pages total).
Gharsellaoui, et al., "Optimizing Access Point Selection in Wireless Local Area Networks", In Proceedings of International Conference on Communications and Information Technology, Mar. 29, 2011, (6 pages total).
Achour et al., "Inter-Domain Mobility Management Solution for Service Continuity in IMS-Based Networks", IEEE Consumer Communications and Networking Conference, Jan. 14, 2012, pp. 559-564, 6 pages.
Calhan, et al., "An Adaptive Neuro-Fuzzy Based Vertical Handoff Decision Algorithm for Wireless Heterogeneous Networks", In IEEE 21st International Symposium Personal Indoor and Mobile Radio Communications, Sep. 26, 2010, (6 pages total).
Yan, et al., "A Survey of Vertical Handover Decision Algorithms in Fourth Generation Heterogeneous Wireless Networks", In Computer Networks: The International Journal of Computer and Telecommunications Networking, vol. 54, Issue 11, Aug. 2010, (16 pages total).
Liu, et al., "Performance Analysis and Optimization of Handoff Algorithms in Heterogeneous Wireless Networks", In IEEE Transactions on Mobile Computing, vol. 7, Issue 7, Jul. 2008, (12 pages total).
Wong, et al., "A Pattern Recognition System for Handoff Algorithms", In IEEE Journal on Selected Areas in Communications, vol. 18, Issue 7, Jul. 2000, (12 pages total).
"Optimal Call Routing", Retrieved on: Dec. 31, 2013, Available at: http://www.bics.com/content/ocr (2 pages total).
Kalmanek, et al., "A Network-Based Architecture for Seamless Mobility Services", In IEEE Communications Magazine, vol. 44, Issue 6, Jun. 2006 (7 pages total).
Salkintzis, et al., "Voice Call Handover Mechanisms in Next-Generation 3GPP Systems", In IEEE Communications Magazine, vol. 47, Issue 2, pp. 46-56, Feb. 2009 (11 pages total).
Voice Call Flow Overview, 2007 Cisco Systems, Inc., pp. 1-14, Retrieved from: http://www.cisco.com/en/US/docs/ios/voice/monitor/configuration/guide/vt_callflow_ov.pdf, Retrieved on: Jun. 17, 2013 (14 pages total).
J. Rosenberg, "Interactive Connectivity Establishment (ICE): A Protocol for Network Address Translator (NAT) Traversal for Offer/Answer Protocols", IETF Trust (Apr. 2010), Retrieved from: http://www.rfc-editor.org/rfc/rfc5245.txt, Retrieved on: Sep. 12, 2013 (110 pages total).
M. Baugher, et al., "The Secure Real-time Transport Protocol (SRTP)", The Internet Society (Mar. 2004), Retrieved from: http://www.rfc-editor.org/rfc/rfc3711.txt, Retrieved on: Sep. 12, 2013 (53 pages total).
J. Rosenberg, et al., "SIP: Session Initiation Protocol", The Internet Society (Jun. 2002), Retrieved from: http://www.rfc-editor.org/rfc/rfc3261.txt, Retrieved on: Sep. 12, 2013 (252 pages total).
H. Schulzrinne, et al., "RTP: A Transport Protocol for Real-Time Applications", The Internet Society (Jul. 2003), Retrieved from: http://www.rfc-editor.org/rfc/rfc3550.txt, Retrieved on: Sep. 12, 2013 (98 pages total).
Bryan, et al., "SOSIMPLE: A SIP/SIMPLE Based P2P VoIP and IM System," Computer Science Department, College a of William and Mary, Williamsburg, VA, Retrieved from: http://www.enseirb.fr/~kadionik/sip/paper, Retrieved Date: Sep. 16, 2013 (6 pages total).
Rauhala, J., "Universal SIP client for consumer devices," Helsinki University of Technology, Department of Electrical Communications Engineering, Thesis submitted May 13, 2003, Retrieved from: http://scholar.google.com/url?sa=U&q=http://antoine.fressancourt.free.fr/exjobb/BX_Universal, Retrieved Date: Sep. 16, 2013 (64 pages total).
Santos, et al., "Deployment of a Wireless Hybrid and Mobile Network for VoIP Services Based on Open Source Software," Universidade Federal de Campina Grande, Retrieved From: http:/www.inf.int-evry.fr/~olberger/wfs2006/danilo, Retrieved Date: Sep. 16, 2013 (20 pages total).
"Route to Home", Published on: Mar. 10, 2012, Available at: http://www.inovar.com/products/RouteToHome.html (1 page total).
"Smart Call Routing", Retrieved on: Dec. 31, 2013, Available at: http://www.roamware.com/downloads/datasheets/Smart%20Call%20Routing.pdf (2 pages total).
"Roaming Call Optimizer," Published on: Mar. 22, 2011, Available at: http://www.starhome.com/call-optimization.html (1 page total).
"Mobile Collaboration", Retrieved on: Dec. 31, 2013, Available at: http://www.cisco.com/en/US/docs/voice_ip_comm/cucm/srnd/collab09/mobilapp.htmln (39 pages total).
"International Search Report and Written Opinion Received for PCT Patent Application No. PCT/US2014/068685", Mailed Date: Feb. 11, 2015, 7 Pages.
"International Search Report and Written Opinion Issued in PCT Application No. PCT/US2015/39310", Mailed Date: Oct. 14, 2015, (10 Pages total).
"International Search Report and Written Opinion Issued in PCT Application No. PCT/US2015/028679", Mailed Date: Aug. 26, 2015, (11 Pages total).
"International Preliminary Report on Patentability Issued in PCT Application No. PCT/US2014/054633", Mailed Date: Aug. 21, 2015, 6 Pages total.
Ryan Whitman, "A Google Engineer Explains Why KitKat Has White Status Bar Icons and Only Shows Connectivity in Quick Settings", available at <http://www.androidpolice.com/2013/11 /1 8/a-goog le-eng ineer-explains-why-kitkat-has-wh ite-status-baricons-and-only-shows-connectivity-in-quick-settings/>, available on Nov. 18, 2013, (3 pages total).
"International Search Report and Written Opinion Issued in PCT Application No. PCT/US2015/056290", Mailed Date: Feb. 1, 2016, (15 Pages total).
"Second Written Opinion Issued in PCT Application No. PCT/US2015/023453", Mailed Date: Mar. 1, 2016, 6 Pages.

\* cited by examiner

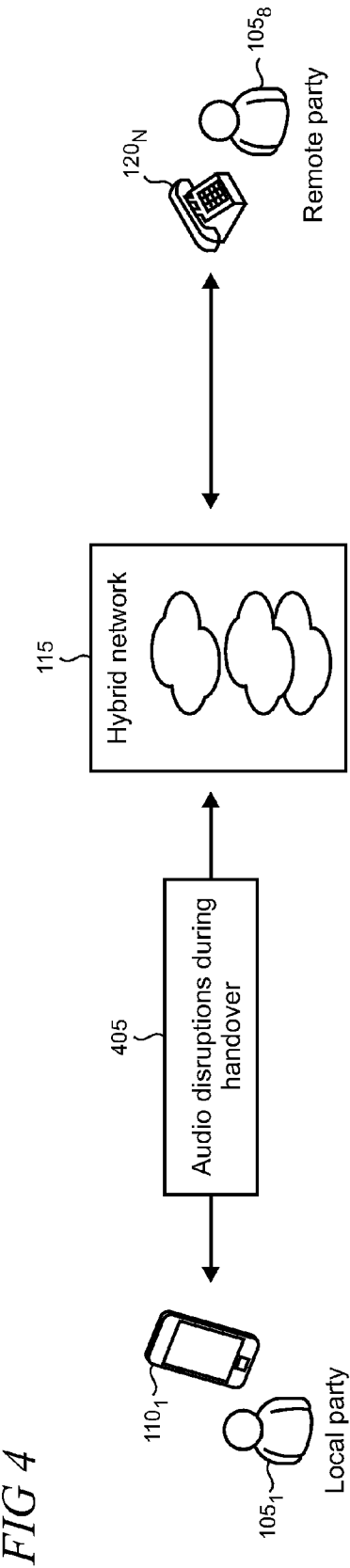

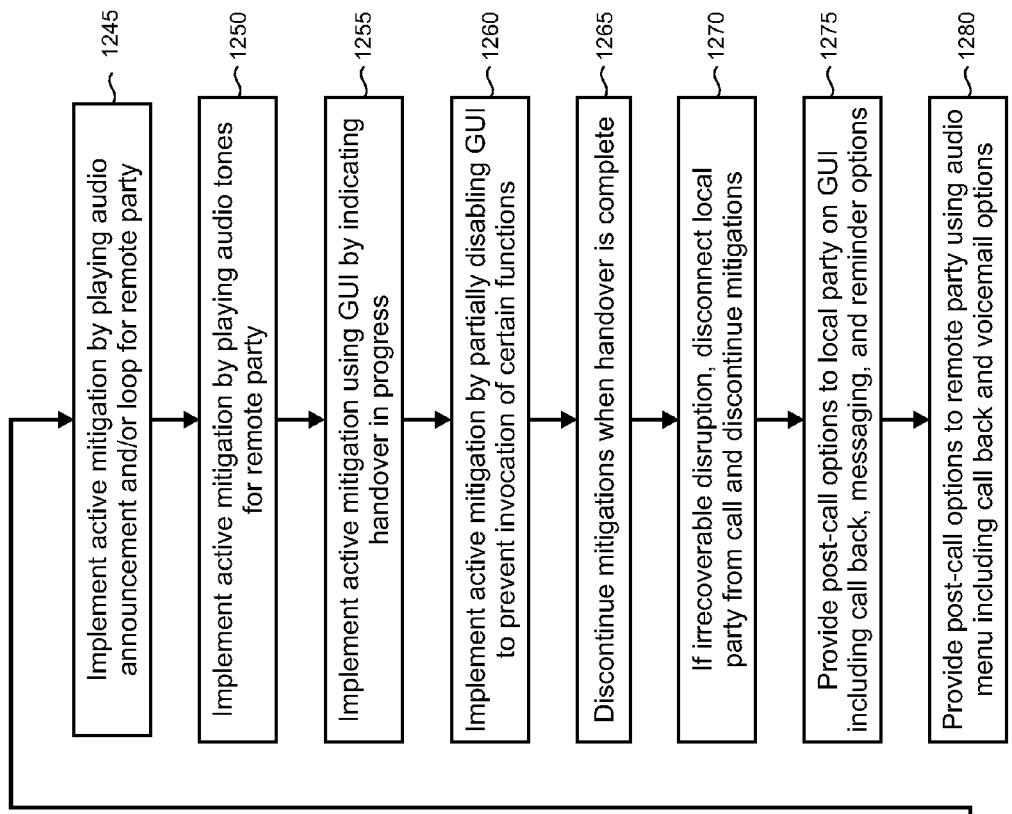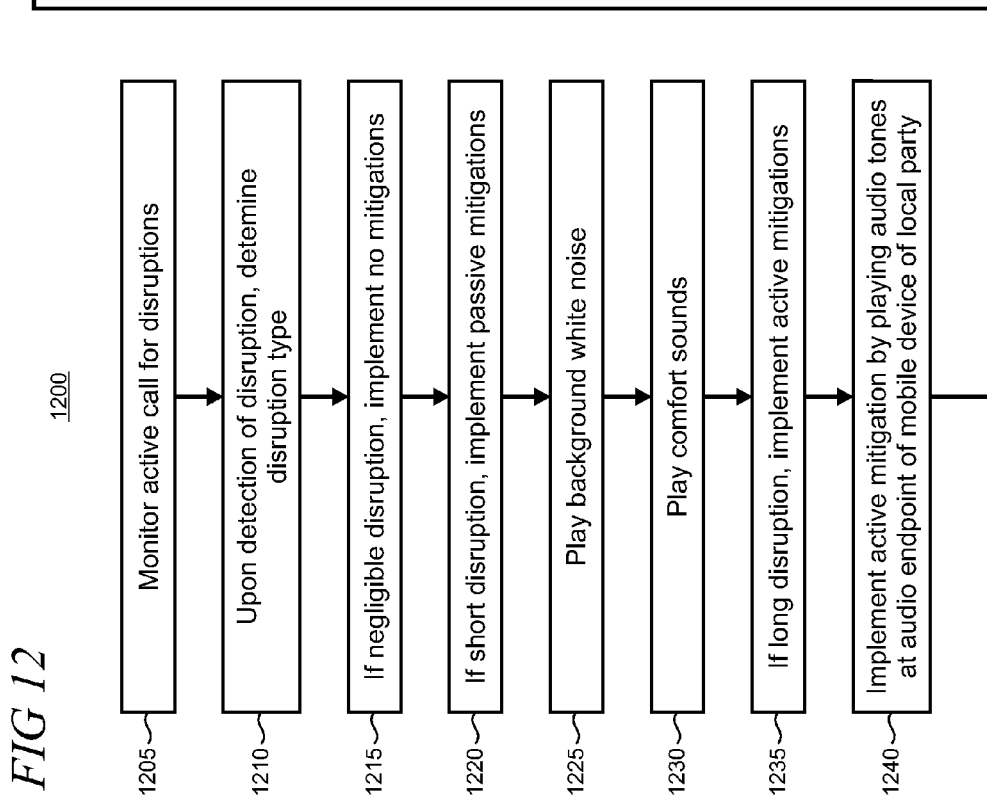
FIG 12

USER EXPERIENCES DURING CALL HANDOVERS ON A HYBRID TELECOMMUNICATIONS NETWORK

BACKGROUND

Mobile devices are leveraging new communication services that are traditionally associated with cellular systems which are being provided over several different media, including VoIP (Voice over Internet Protocol) and data access over Wi-Fi (under IEEE 802.11), VoIP and data access over cellular packet-switched data networking, and legacy cellular voice. While such new communication services can often provide satisfactory performance, opportunities exist to make them more effective with more comprehensive features and benefits to users.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A mobile device having a capability to connect to a hybrid telecommunications network using different connection types—for example, Wi-Fi and cellular voice and data connections—is configured to implement various mitigations to audio disruptions that may occur during the performance of a call handover between connections. The call handover may be utilized, for example, to maintain voice call continuity if a given connection starts to degrade and/or when a more optimal connection is available (such as one that is less expensive, more reliable, higher quality, provides additional features, etc.).

The particular mitigations utilized depend on the duration of the audio disruption so that negligible audio disruptions that do not impact the conversation between parties to the call are not mitigated at all, while relatively short audio disruptions are mitigated in a passive manner by playing background white noise or comfort sounds on the mobile device to indicate to its user that something is happening so the user does not hang up on the call while the handover is in progress. Audio disruptions having relatively longer duration are dealt with using more active mitigations in which audio tones are played and the mobile device's graphical user interface (GUI) is configured to indicate to the user that a handover is in progress. Audio disruptions having durations which are determined to be irrecoverable are handled by disconnecting the call and providing options to the user through the GUI to either call the other party back, send a message, or set a callback reminder.

The hybrid telecommunications network may be configured to provide audio mitigations for the party at the other end of the call (i.e., the remote party) as the handover is being performed for the user at the mobile device (i.e., the local party). The audio mitigation for the remote party includes, for example, a looped playback of a recorded message comprising one or more words such as "reconnecting" (or its non-English equivalents). In the case of an irrecoverable disruption, the hybrid telecommunications network can provide an audio menu to which the remote user can respond using DTMF (Dual Tone Multi-frequency) "touch tone" signaling to variously place a callback to the local user or leave a voicemail message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 4 shows illustrative audio disruptions that may occur during a handover;

FIG. 5 shows a table of illustrative examples of audio disruption types and exemplary actions that are taken in response to an occurrence of each type of audio disruption;

FIG. 12 is a flowchart of an illustrative method for implementing user experiences during call handovers in a hybrid telecommunications network;

Like reference numerals indicate like elements in the drawings. Elements are not drawn to scale unless otherwise indicated.

DETAILED DESCRIPTION

Figure 1:
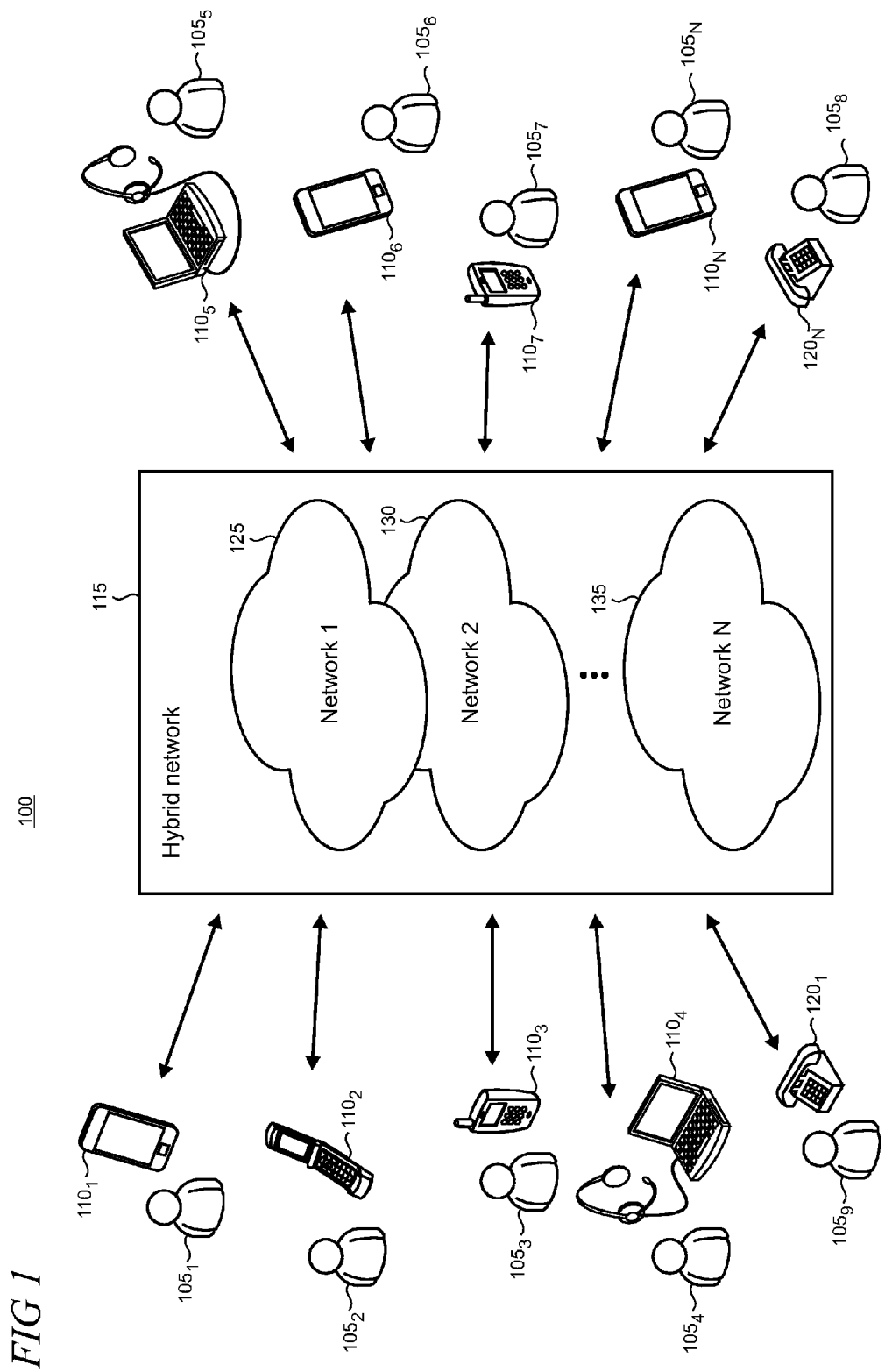
FIG. 1 shows an illustrative telecommunications environment in which devices having telephony capabilities communicate over a hybrid telecommunications network.

FIG. 1 shows an illustrative telecommunications environment 100 in which various users 105 employ respective devices 110 that communicate over a hybrid telecommunications network 115. The devices 110 provide voice telephony capabilities and typically support data-consuming applications such as Internet browsing and multimedia (e.g., music, video, etc.) consumption in addition to various other features. The devices 110 may include, for example, user equipment, mobile phones, cell phones, and smartphones which users often employ to make and receive voice and/or multimedia calls. However, alternative types of electronic devices are also envisioned to be usable within the telecommunications environment 100 so long as they are configured with telephony capabilities and can connect to the hybrid telecommunications network 115, as described in more detail below. Such alternative devices variously include handheld computing devices, PDAs (Personal Digital Assistants), portable media players, wearable computers, navigation devices such as GPS (Global Positioning System) systems, laptop PCs (personal computers) desktop computers, multimedia consoles, gaming systems, or the like. In the discussion that follows, the use of the term "mobile device" is intended to cover all devices that are configured with telephony capabilities and are capable of wireless connectivity to the hybrid telecommunications network 115.

Other types of telephony equipment may also be present in the telecommunications environment 100 such as conventional desktop phones 120 which are operatively coupled to a public switched telephone network (PSTN). Other examples may include equipment that connects to the PSTN using private branch exchanges (PBXs) and equipment coupled to call services that are accessed using telephone numbers. This other telephony equipment may still be utilized in various scenarios involving a hybrid telecommunications network connection indicator, even though it might not implement such functionality itself. For example, a mobile phone 110 may make or receive a call to a desktop phone 120 and employ voice call continuity as the prevailing connection conditions change such as when the mobile device user moves from a car to home during a call.

The hybrid network 115 comprises several networks 1, 2 . . . N, identified in FIG. 1 by reference numerals 125, 130, and 135, respectively. Typically, the various networks will be accessed using different types of wireless connections including Wi-Fi, cellular packet-switched data, or cellular circuit-switched voice connections. Thus, the networks in the hybrid network 115 typically include a VoIP network and a mobile operator (MO) network which typically includes an access network portion and a core network portion that provides for switching, routing, transport, and other functionalities. A PSTN wireline network may also be included as part of the hybrid network in some implementations, as discussed in more detail below.

Each mobile device 110 will typically have a prearranged association with one or more of the networks underlying the hybrid network 115. For example, a user 105 will typically be a subscriber to a cellular telephone service so that the user's mobile device 110 can access a given cellular network as valid and authenticated user equipment. Similarly, the mobile device 110 may include functionality and credentials to access a Wi-Fi network. The mobile devices 110 may also interoperate with a VoIP network (shown below in FIGS. 2 and 3) and be capable of providing voice call continuity (VCC) across different connection types according to a pre-arranged association. Such mobile devices are considered "VCC-equipped" and can make calls over different types of connections including Wi-Fi, cellular voice, and cellular data connections.

In some situations, a mobile device may be placed in a dock or cradle that is coupled to the PSTN and thus could employ a wireline connection for a call which is often the least expensive network connection. Typically, the mobile devices 110 use the less expensive Wi-Fi connection whenever it is available and capable of providing a reasonable level of call quality. When Wi-Fi is not available or is inadequate for the voice call, the call may be made over one of the other available network connection options after determining that the selected connection will result in acceptable call quality. Cellular voice is typically the costliest connection alternative but also the most ubiquitous and so it is used to ensure that the user has access to calling services from as wide an area as possible. In the description that follows, the mobile devices 110 are considered to be VCC equipped unless otherwise indicated.

Figure 2:
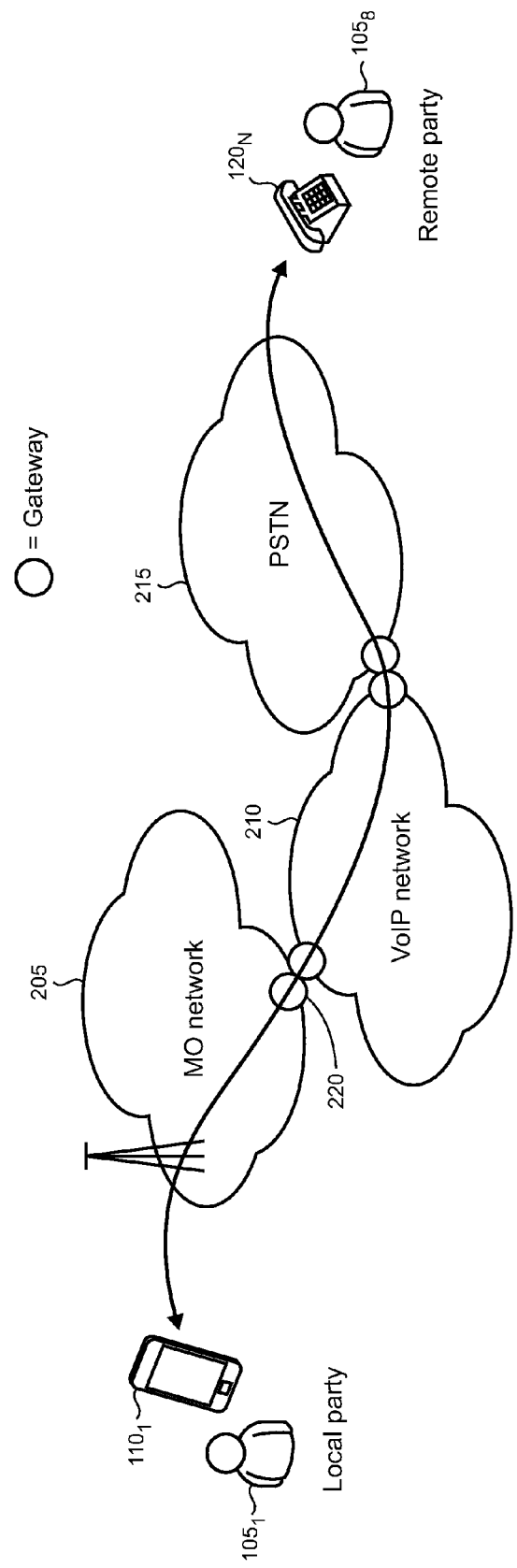
FIG. 2 shows an illustrative example in which a call is carried over multiple types of telecommunications networks.

A characteristic of the hybrid network 115 is that two or more of the underlying networks (e.g., networks 125, 130, 135) are considered loosely coupled. That is, in one illustrative example, the VoIP network and the MO network are typically operated independently so that one network cannot exercise significant or substantial control over the operation of the other. However, as shown in FIG. 2, the underlying networks, while loosely coupled, are still interoperable so that calls can traverse an MO network 205, VoIP network 210, and PSTN 215. Such interoperability is commonly facilitated using gateways, as representatively indicated by reference numeral 220. It is becoming increasingly common for significant portions of a given call to be transported over the VoIP network 210 because such networks can often provide very high quality transportation at the lowest cost to the network operators. In such cases, the MO network 205 and the PSTN network 215 essentially function as access networks to the mobile device at each end of the call while the VoIP network 210 performs the bulk of the routing and transport for the call. Other access networks may also be utilized in order for a call to reach the VoIP network 210 including both cellular circuit-switched and packet-switched networks, and Wi-Fi access points such as public Wi-Fi "hotspots" and those provided by home and office Internet Service Providers (ISPs).

While such hybridization can provide cost-effective and high quality transport, the loose coupling has traditionally presented difficulties for voice call continuity. Voice call continuity functionality is defined here as the maintenance of ongoing voice calls for a device that is capable of placing and receiving voice calls in the face of changes in prevailing connection conditions perhaps due to user mobility or other environmental factors. For example, the connection currently being used, such as Wi-Fi under IEEE (Institute of Electrical and Electronic Engineers) 802.11 could start demonstrating worsening radio signal and/or network congestion conditions, or the user could move to a location where the Wi-Fi connection does not work at all. In addition, other connection options may become available that are lower cost, or provide a better user experience, and therefore either or both the user and network operator may wish to utilize such connection options.

Figure 3:
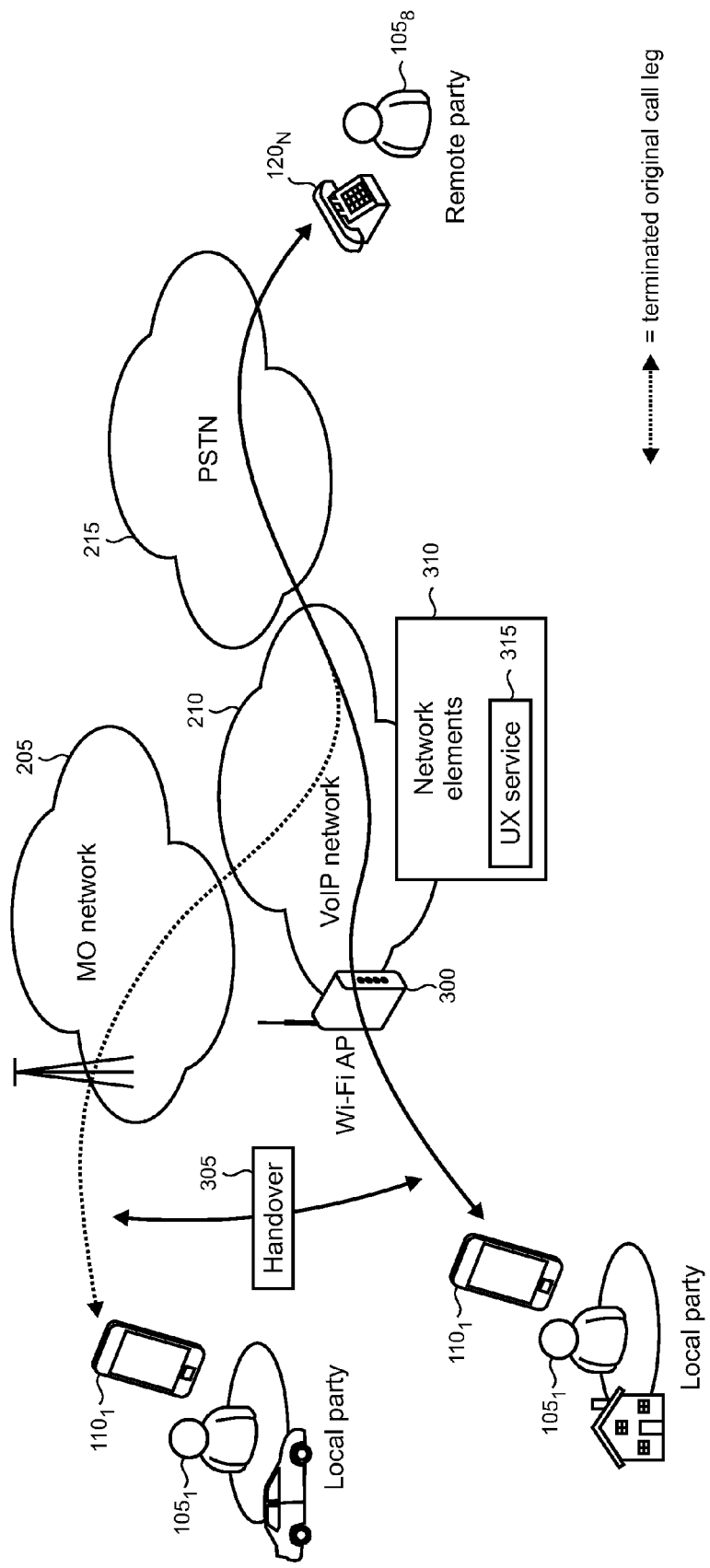
FIG. 3 shows an illustrative example in which a call is handed over between two different networks.

For example, as shown in FIG. 3, a user 105 may be in the car when initiating a call over the MO network 205. When the user 105 returns home, another call leg is then created over a selected connection which in this example is the home Wi-Fi connection via a Wi-Fi access point (AP) 300 to the VoIP network 210. The selected connection is associated with the call, preferably while the original call is still ongoing (in what is termed a "make-before-break" handover). When the new call leg is stable, the original call leg is removed from the call and the handover 305 to the new connection is complete.

If the handover is initiated so that both the original and newly selected connections are operative simultaneously, then there will be an intermediate state in which both call legs will be running in parallel. Media flows can be directed to and from the mobile device over these parallel connections, until one of the two flows is terminated. Such intermediate state enables the call to be maintained in an uninterrupted manner as perceived by the parties on both ends of the call. During the intermediate state, the mobile device can typically choose to connect to one of the two flows as it deems appropriate.

FIG. 3 also shows network elements 310 that are instantiated in the VoIP network 210. The network elements 310 can be configured and utilized to support various features in the hybrid communications network including, for example, VCC. In addition, the network elements 310 expose a user experience (UX) service 315 that is utilized to support various aspects of the present user experiences during call handovers, as described below.

As depicted in FIG. 4, it may be possible that call audio is disrupted for a period of time, for example several seconds, during VCC while the call is handed over to a different connection. This can be particularly so in the case of Wi-Fi-to-cellular handovers because it is common to take several seconds to establish a cellular call during which time the audio cannot be communicated between the parties to the call. Since voice calls are real-time interactive experiences, such audio disruptions (indicated by reference numeral 405 in FIG. 4) can have the following implications: 1) User annoyance, leading to dissatisfaction with a product or service; and, 2) Hanging-up prematurely—here, an interruption of even a few seconds can be perceived as a long time when it occurs during a call and either/or both parties might hang up without allowing sufficient time for the handover to be completed.

In scenarios in which normal calls are deliberately interrupted, such as a customer service representative placing a customer's call on hold, it is common practice to play sounds such as audio tones, music, and the like to mitigate the perceived disruption in the call. Such mitigation typically functions to inform the user that the call is still active and ongoing and not to hang up. Otherwise without hearing sounds (what is commonly referred to as experiencing "dead air"), the user might think the call got disconnected and hang up.

This technique, however, is unlikely to be successfully applied as-is to VCC scenarios because audio imperfections occur in Wi-Fi calls frequently, so playing audio tones at every single disruption can be expected to pollute the call with unnecessary interference and make the call interruptions seem even more disruptive. In addition, call transport handovers tend to be unpredictable and can occur without notice to the user which is thus a distinctly different experience for the user than being placed on hold.

Accordingly, it may be desirable that the content of the audio tones used to mitigate disruptions provide sufficient and clear indication to users to inform them as to what is happening with the handover and shape their expectations as to what will occur next. Such expectations can be different for a user on a VCC-equipped mobile device (referred to in the description below and the accompanying drawings as the "local party") compared to a remote party using conventional equipment to whom the user is talking. In addition to audio mitigations, it can be helpful to provide a visual indication on the mobile device's graphical user interface (GUI) because oftentimes a user's first instinct in such situations is to take the phone off their ear and look at the display screen to see what may be occurring.

Existing solutions do not employ such mitigations and as a result they typically need to implement transport handovers prematurely—that is, while the Wi-Fi call is still healthy and has not degraded fully—in order to reduce the amount of time in which there is dead air/no audio. Such premature handovers can thus cause mobile devices to abandon the less expensive Wi-Fi connection sooner and stay on the more expensive cellular connection longer than necessary. Making the handover disruptions more tolerable to users of VCC-equipped mobile devices can advantageously delay triggering a handover thereby keeping the call on a Wi-Fi connection longer in some cases, and avoid unnecessary handovers altogether in others, which results in lower costs for the user per call.

In accordance with the present principles, the audio disruptions 405 are categorized into four different types, as shown in the table 500 in FIG. 5. Table 500 shows the disruption type in the left column and the mitigation that is responsive to each disruption type in the right column. In the discussion that follows various time intervals and durations are provided in order to highlight aspects and features of the present user experiences during call handovers. It is emphasized that such time intervals and durations are intended to be illustrative and that other time intervals and durations may be utilized to meet the needs of a particular implementation.

A negligible disruption 505 is defined as an event in which audio is interrupted during a handover attempt for a very short period of time, for example, 0.5 seconds or less. Such negligible disruptions are deemed as "glitches" as they have been observed to have no meaningful impact on the conversation between the parties to a call. Accordingly, as indicated by reference numeral 510 in the right-hand column of table 500, no mitigations are implemented when a negligible disruption occurs during a handover.

A short disruption 515 is defined as an event in which audio is interrupted during a handover attempt for a relatively short period of a few seconds, for example, approximately 0.5-3 seconds. It can be expected that short disruptions have some moderate impact to the conversation between the parties but are generally "self-correcting." A party may miss only a word or two, but not the entire sentence, and the conversation typically gets back on track when a party asks the other to repeat what was said.

It has been observed that there is generally a very low risk of a given user hanging up when experiencing a short disruption during a handover. As indicated by reference numeral 520 in table 500, the response to a short disruption includes what are termed "passive mitigations." Passive mitigations employ relatively subtle techniques to keep the user from hanging up on the call and getting annoyed. In typical usage scenarios, the passive mitigations are effective in shaping behavior and expectations without necessarily being given significant conscious attention from most users.

Figure 6:
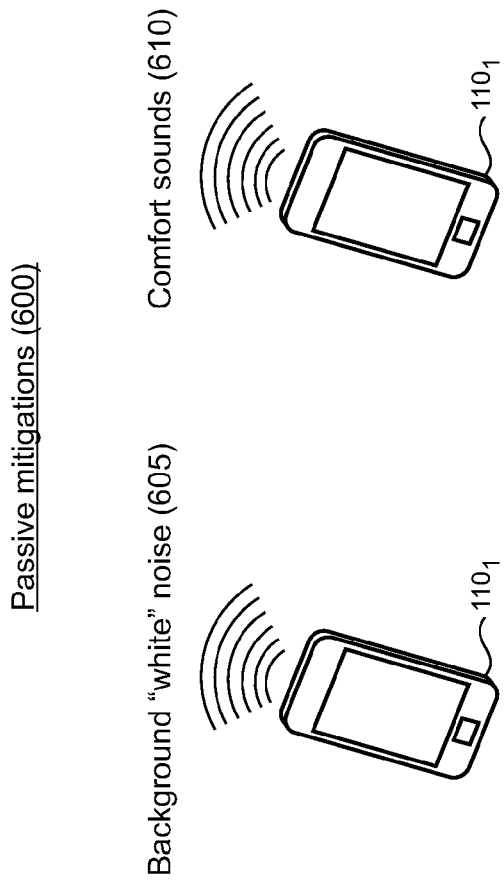
FIG. 6 shows illustrative passive mitigations.

As shown in FIG. 6, passive mitigations 600 include playing background white noise 605 and/or comfort sounds 610 through the audio endpoint on the mobile device 110 which may include the device's internal speaker, a wired or wireless headset/earpiece, and the like. Background white noise 605 is similar to what a user normally faintly hears in the background when the call is active but the other party is not speaking. Comfort sounds 610 can have a similar effect as background white noise and may include sounds that are commonly soothing and relaxing to hear such as the sound of ocean waves, rainfall, and the like. Hearing white noise or comfort sounds can make short disruptions more tolerable to users in many cases.

In some implementations, all interruptions of approximately 3 seconds or less, including negligible disruptions, can be handled as short disruptions using passive mitigations. It is also noted that passive mitigations are typically implemented only for the local party using a VCC-equipped mobile device. However, passive mitigations may also be implemented for the remote party in alternative implementations.

Returning to FIG. 5, a long disruption 525 is defined as a relatively longer event in which audio is interrupted during a handover attempt for a period of time beyond some threshold, for example 3 seconds. There is generally a greater risk of a given user getting annoyed and hanging up when experiencing a long disruption during a handover as compared to a short one. As indicated by reference numeral 530 in table 500, the response to a short disruption includes what are termed "active mitigations."

Figure 7:
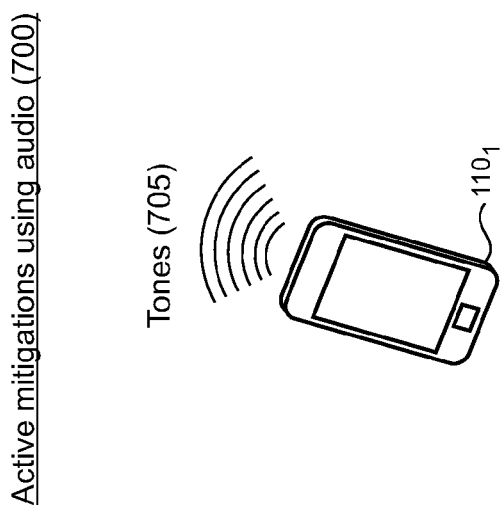
FIG. 7 shows illustrative active mitigations using audio.

Active mitigations typically employ more overt techniques compared to the relatively subtle techniques utilized for passive mitigations. Here, the user's attention is explicitly sought. For example as shown in FIG. 7, audio active mitigations 700 include playing tones 705 through the audio endpoint on the mobile device 110. The particular tones utilized can vary by implementation. Generally, the tones 705 are designed to convey the impression to the user that the call is still active, something is going on, and the user should not hang up on the call. It is noted that tones may generally be more desirable in many implementations than using spoken words to convey such information so as to keep the user experience lightweight during active mitigations. As the user is likely to experience active mitigations with some frequency, the meaning of the tones 705 can be expected to become readily learned and appreciated as a desirable feature of the mobile device 110. Utilization of the tones 705 helps to reinforce the user's appreciation that handovers often occur in order to enable calls to be provided at the lowest cost. Thus, hearing the tones becomes an accepted part of the user experience supported on the mobile device 110 and the user's opportunities for annoyance during handovers are diminished.

Figure 8:
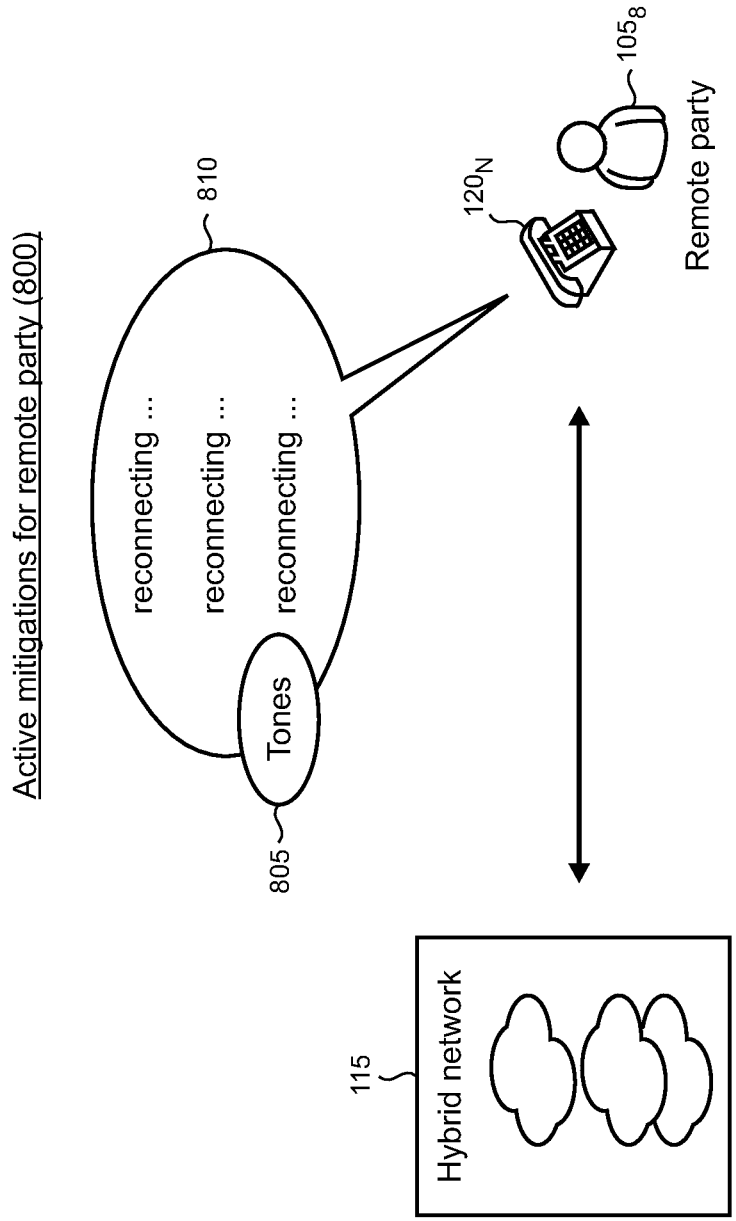
FIG. 8 shows illustrative active mitigations that are implemented for a remote party.

Audio active mitigations 800 can be implemented for the remote party on the call as shown in FIG. 8. As noted above, the local party having the VCC-equipped mobile device will learn and appreciate how the audio active mitigations associated with call handovers are implemented and their meaning. However, the remote party without a VCC-equipped device cannot be expected to have the same appreciation. Accordingly, the audio active mitigations presented to the remote party by the UX service 315 (FIG. 3) are configured to be more explanatory in order to reduce the likelihood of a remote party hang up.

In this illustrative example, a combination of audio tones 805 and a single spoken word 810 (here, "reconnecting") played in a repeating loop is presented to the remote party as shown. Other spoken words and/or combinations of words can be utilized in alternative implementations with or without use of the tones. However, it is generally desirable that the spoken word be short enough in duration that the call can be resumed quickly as soon as audio starts flowing in order to minimize the feeling that a half spoken sentence got interrupted.

Figure 9:
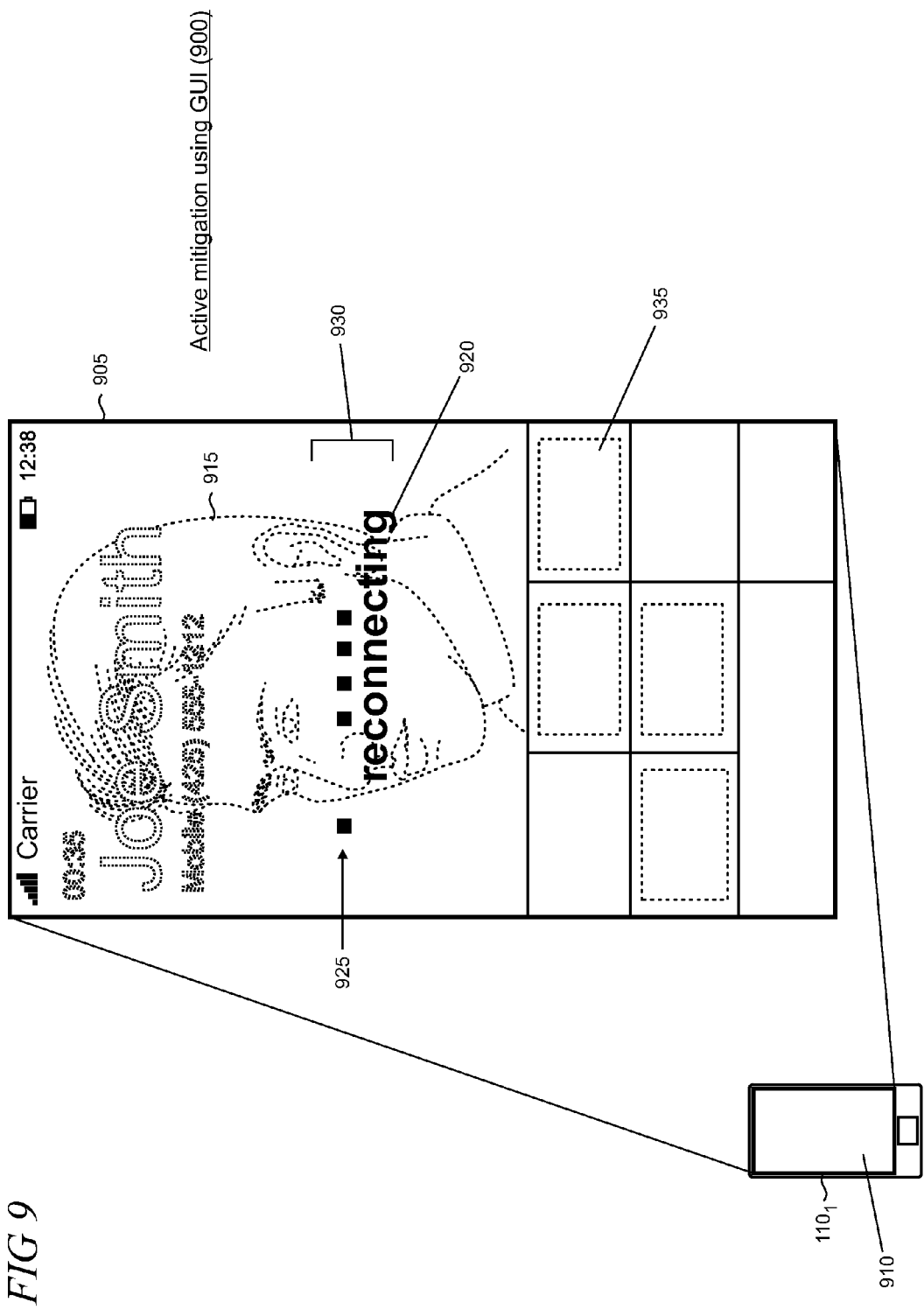
FIG. 9 shows illustrative active mitigations using a user interface supported by a mobile device.

In addition to audio treatments, GUI active mitigations may be utilized to provide a visual indication that a handover is in progress. As shown in FIG. 9, the GUI 905 (shown in an enlarged detail view in the drawing) supported on the display screen 910 of the mobile device 110 is configured to indicate that a handover is in progress. The particular techniques used on the GUI 905 to indicate that the handover is in progress can vary according to the needs of a particular implementation. In this illustrative example, a portion of the GUI 905 that normally shows a picture of the called party and the called party's name and telephone number is "grayed out" (i.e., visibly darkened so that it is not rendered in its usual manner) as representatively indicated by the dotted lines 915.

A text string 920 with graphic object 925 is also positioned as an overlay 930 on top of the content normally displayed on the GUI 905 during calls. In this illustrative example, the text string comprises the single word "reconnecting" and the graphic object 925 includes a group of substantially rectangular elements. In some cases animation, including motion, color and brightness changes, and the like may be applied to either or both the text and the graphic object in the overlay 930.

As noted above, GUI active mitigations can be responsive to the user's natural tendency to look at the mobile device's display screen when an audio interruption occurs. Here, when the user sees the "reconnecting message in the overlay 930, the meaning of the audio tones is described and/or reinforced for the user.

The GUI active mitigations 900 may also include a feature in which the GUI 905 is partially disabled to prevent the user from invoking functions that would be inappropriately executed or not technically possible to execute while the call handover is in progress. This feature is shown in FIG. 9 in which some of the controls (e.g., touch-responsive buttons), as representatively indicated by reference numeral 935, that are displayed towards the bottom of the GUI 905, are grayed out, as depicted using the dotted lines in the drawing. Such disabled functions may include, for example, placing the current call on hold, initiating conference calling (e.g., a three-way call), initiating a video chat or messaging, and the like. Other buttons on the GUI may still function normally even though others are disabled. The particular features and functions that are enabled and disabled may vary by implementation.

Returning again to FIG. 5, an irrecoverable disruption 535 is defined as an event in which audio is interrupted during a handover attempt for a period of time beyond some threshold, for example 10 seconds. In such a case the call is considered irrecoverably disrupted as there is unlikely to be any form of mitigation that would be effective in managing caller annoyance. The call is disconnected in response to an occurrence of an irrecoverable disruption, as indicated by reference numeral 540.

Figure 10:
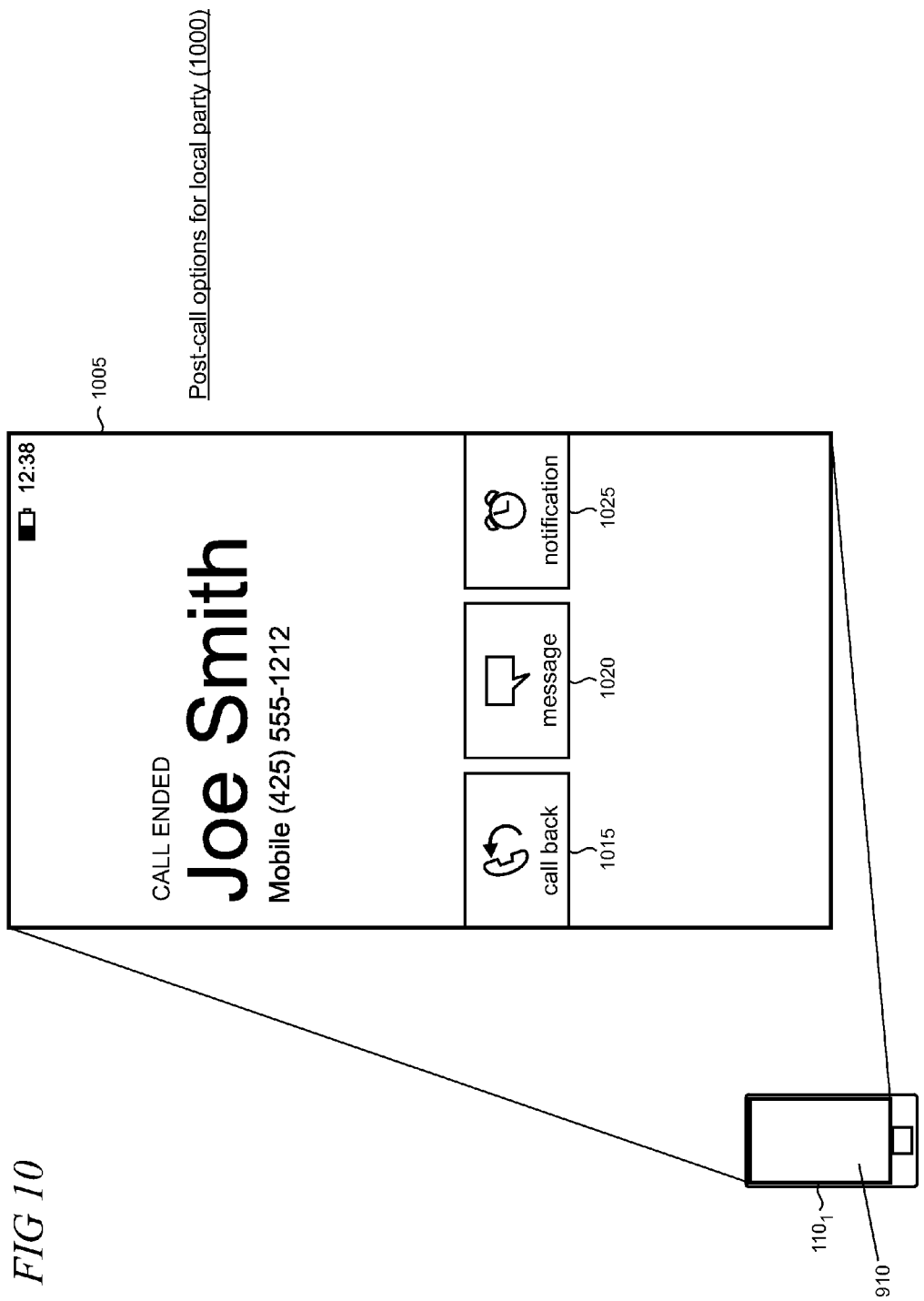
FIG. 10 illustrates exemplary post-call options provided to a local party.

Post-call options may also be provided to either or both the local and remote parties in response to an occurrence of an irrecoverable disruption. For the local party, an illustrative set of post-call options 1000 are shown in FIG. 10. In this example, the post-call options which enable the user 105 to reinitiate communication with the remote party are implemented using a GUI 1005 that is supported on the display screen 910 of the mobile device 110. As shown, user controls in the form of buttons 1015, 1020, and 1025 are provided which may be manipulated by the user 105, for example by a tap or other touch gesture or combination of gestures. In some implementations the mobile device 110 may be configured to enable the user controls to be invoked using non-touch gestures and/or voice commands.

The user may invoke a new call to be placed to the remote party from the prior disconnected call by using the call-back button 1015. A text message can be composed and sent to the remote party by using the message button 1020. The user can invoke a reminder menu with notification button 1025 in order to set a reminder to contact the remote party at some future time. It is emphasized that these particular call-back options for the local party are illustrative and that other options can provided as may be appropriate for a particular implementation.

Figure 11:
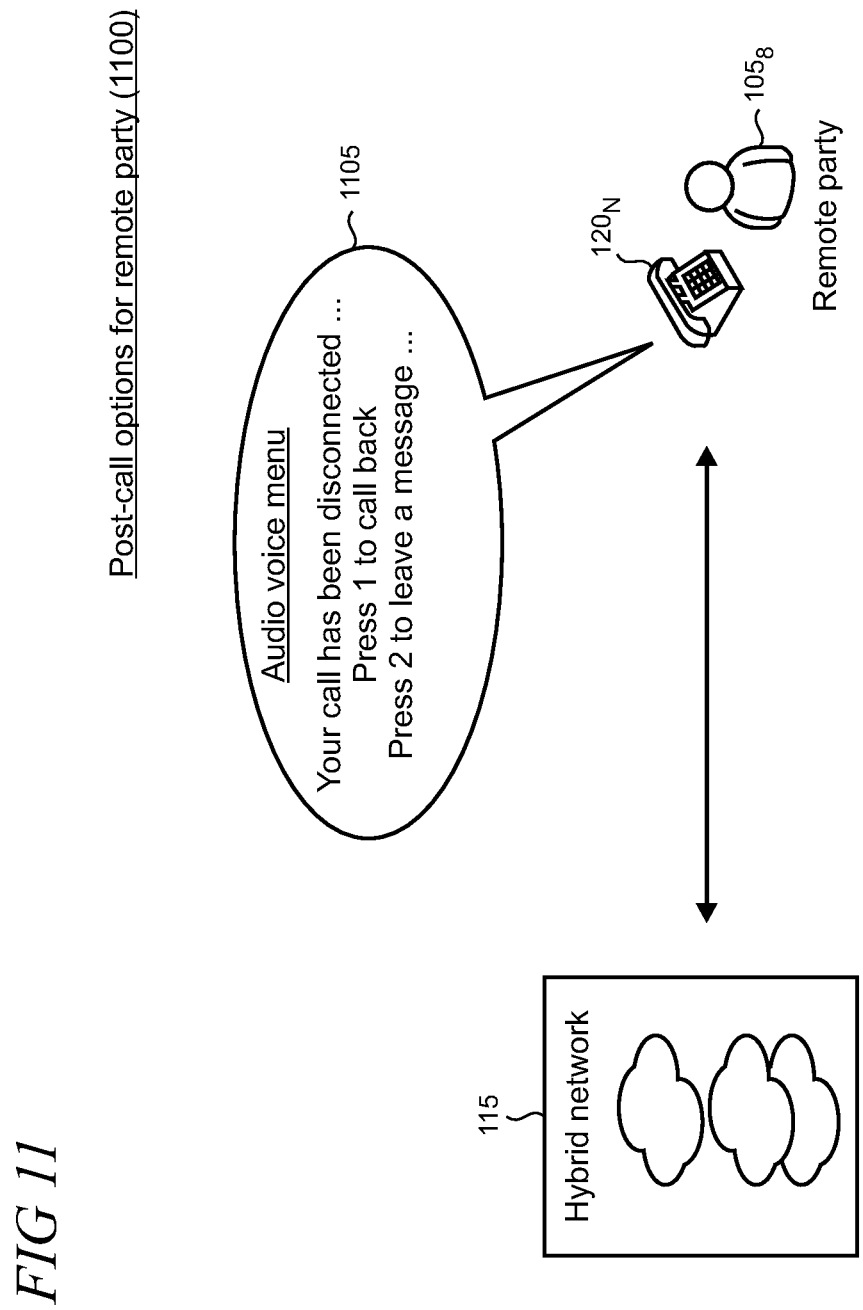
FIG. 11 illustrates exemplary post-call options provided to a remote party.

For the remote party, an illustrative set of post-call options 1100 are shown in FIG. 11. In this example, the post-call options are provided using a voice menu 1105 that is played as audio by the UX service 315 (FIG. 3). The voice menu 1105 informs the remote user that the call has been disconnected and provides options for reconnecting. This can be accomplished because, although the local party is disconnected, the remote party is still connected to the VoIP network 210 (FIG. 2) portion of the hybrid telecommunications network 115.

The UX service 315 can thus play the voice menu 1105 to the remote user to provide options for reconnecting to the local party including calling back and leaving a voicemail message, as shown. The remote user can responsively invoke a selected one of the various options 1100 using DTMF (Dual-tone Multi-frequency) signaling by pressing the appropriate number key or key combination on the phone or other device. The UX service 315 and/or other network elements 310 in the VoIP network 210 can then initiate the reconnection options to the local party in response to the received DTMF signaling from the remote party.

FIG. 12 is a flowchart of an illustrative method 1200 for implementing user experiences during call handovers in the hybrid telecommunications network 115 (FIG. 1). Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Some aspects of the method 1200 may be performed on VCC-equipped mobile device 110. For example, the mobile device can be configured with functionality and/or components implemented in code that is instantiated in various ones of applications, middleware, operating system, firmware, and hardware (or combinations and sub-combinations thereof) that execute on the mobile device 110 to support the present user experiences. Other aspects of the method 1200 can be implemented using the UX service 315 (FIG. 3) and/or other network elements 310 in the VoIP network 210 (accordingly the UX service 315 referred to in the description below should be understood as referring to the UX service and/or the other network elements).

In step 1205, the UX service 315 monitors a currently active call between the local and remote parties for audio disruptions. In step 1210, when a disruption is detected, the type of disruption is determined. For example, a detected disruption may be one of the types shown in table 500 in FIG. 5 and described in the accompanying text. In step 1215, if the detected disruption is a negligible disruption, then no mitigations typically need to be implemented. In step 1220, if the detected disruption is a short disruption, then passive mitigations can be implemented. These include playing background white noise in step 1225 and/or playing comfort sounds in step 1230.

In step 1235, if the detected disruption is a long disruption, then active mitigations can be implemented. These include implementing active mitigations using audio by playing audio tones at the audio endpoint of the mobile device 110 for the local party in step 1240. Active mitigations using audio can be implemented for the remote party by the UX service 315 by playing an audio announcement (which can be looped) in step 1245 and/or by playing audio tones in step 1250.

Active mitigations using the GUI on the mobile device 110 may be implemented for the local party in step 1255 by indicting a handover is in progress, as illustratively shown in FIG. 9 and described in the accompanying text. Active mitigations using the GUI may also include partially disabling the GUI in step 1260 so that some features are prevented from being invoked, as illustratively shown in FIG. 9 and described in the accompanying text. The mitigations, whether passive or active, are discontinued when the handover is complete in step 1265.

In step 1270, if the detected disruption is an irrecoverable disruption, then the call with the local party is disconnected and all the mitigations are discontinued. Post-call options are provided to the local party in step 1275 on the GUI of the mobile device 110. These options may include calling back the remote party, sending a message to the remote party, or setting a reminder, as illustratively shown in FIG. 10 and described in the accompanying text.

Post-call options are provided to the remote party in step 1280 by the UX service 315 playing an audio menu as shown in FIG. 11 and described in the accompanying text. These options may include calling back the local party or leaving a voicemail and can be invoked by the remote party by providing a corresponding keypad entry to implement DTMF signaling.

Figure 13:
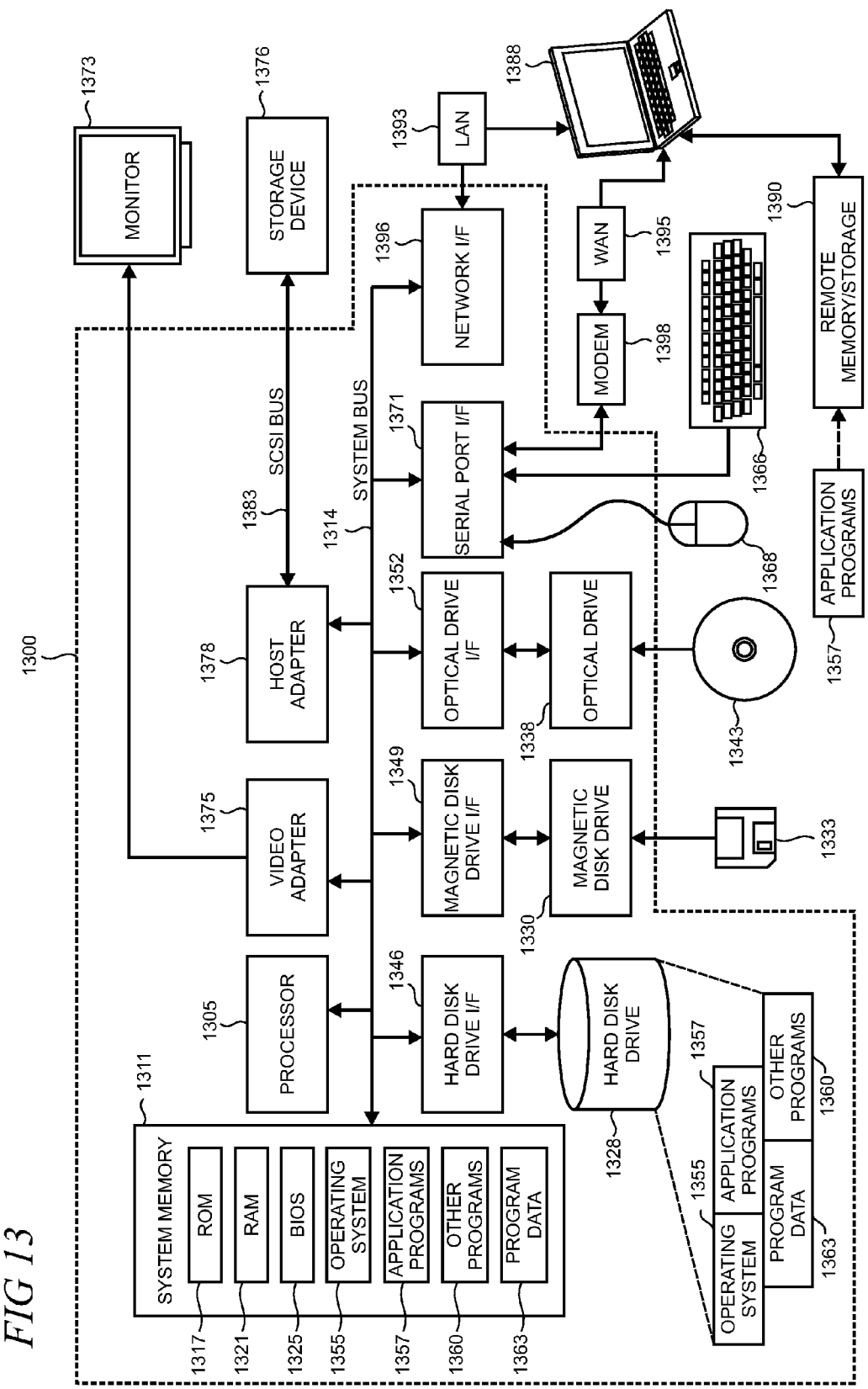
FIG. 13 is a simplified block diagram of an illustrative computer system such as a personal computer (PC) that may be used in part to implement the present user experiences during call handover on a hybrid telecommunications network.

FIG. 13 is a simplified block diagram of an illustrative computer system 1300 such as a personal computer (PC), client machine, or server with which the present user experiences may be implemented in some applications. Computer system 1300 includes a processor 1305, a system memory 1311, and a system bus 1314 that couples various system components including the system memory 1311 to the processor 1305. The system bus 1314 may be any of several types of bus structures including a memory bus or memory controller, a peripheral bus, or a local bus using any of a variety of bus architectures. The system memory 1311 includes read only memory (ROM) 1317 and random access memory (RAM) 1321. A basic input/output system (BIOS) 1325, containing the basic routines that help to transfer information between elements within the computer system 1300, such as during startup, is stored in ROM 1317. The computer system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300. Although this illustrative example includes a hard disk, a removable magnetic disk 1333, and a removable optical disk 1343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present user experiences. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk 1328, magnetic disk 1333, optical disk 1343, ROM 1317, or RAM 1321, including an operating system 1355, one or more application programs 1357, other program modules 1360, and program data 1363. A user may enter commands and information into the computer system 1300 through input devices such as a keyboard 1366 and pointing device 1368 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 13 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computer system 1300, although only a single representative remote memory/storage device 1390 is shown in FIG. 13. The logical connections depicted in FIG. 13 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted that the network connections shown in FIG. 13 are illustrative and other means of establishing a communications link between the computers may be used depending on the specific requirements of an application of the present user experiences.

Figure 14:
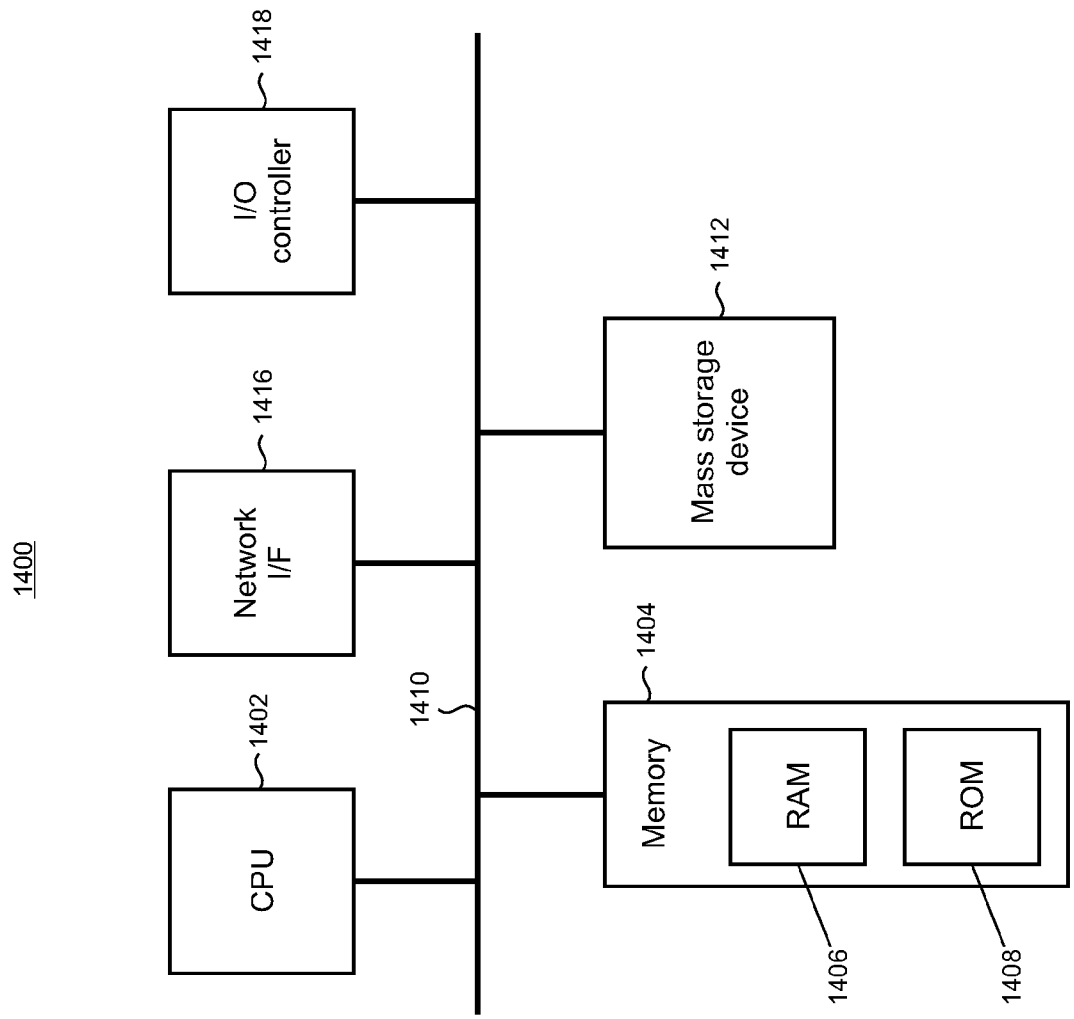
FIG. 14 shows a block diagram of an illustrative device that may be used in part to implement the present user experiences during call handover on a hybrid telecommunications network.

FIG. 14 shows an illustrative architecture 1400 for a device capable of executing the various components described herein for providing the present user experiences. Thus, the architecture 1400 illustrated in FIG. 14 shows an architecture that may be adapted for a server computer, mobile phone, a PDA, a smartphone, a desktop computer, a netbook computer, a tablet computer, GPS (Global Positioning System) device, gaming console, and/or a laptop computer. The architecture 1400 may be utilized to execute any aspect of the components presented herein.

The architecture 1400 illustrated in FIG. 14 includes a CPU 1402, a system memory 1404, including a RAM 1406 and a ROM 1408, and a system bus 1410 that couples the memory 1404 to the CPU 1402. A basic input/output system containing the basic routines that help to transfer information between elements within the architecture 1400, such as during startup, is stored in the ROM 1408. The architecture 1400 further includes a mass storage device 1412 for storing software code or other computer-executed code that is utilized to implement applications, the file system, and the operating system.

The mass storage device 1412 is connected to the CPU 1402 through a mass storage controller (not shown) connected to the bus 1410. The mass storage device 1412 and its associated computer-readable storage media provide non-volatile storage for the architecture 1400.

Although the description of computer-readable storage media contained herein refers to a mass storage device, such as a hard disk or CD-ROM drive, it should be appreciated by those skilled in the art that computer-readable storage media can be any available storage media that can be accessed by the architecture 1400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1400.

According to various embodiments, the architecture 1400 may operate in a networked environment using logical connections to remote computers through a network. The architecture 1400 may connect to the network through a network interface unit 1416 connected to the bus 1410. It should be appreciated that the network interface unit 1416 also may be utilized to connect to other types of networks and remote computer systems. The architecture 1400 also may include an input/output controller 1418 for receiving and processing input from a number of other devices, including a keyboard, mouse, or electronic stylus (not shown in FIG. 14). Similarly, the input/output controller 1418 may provide output to a display screen, a printer, or other type of output device (also not shown in FIG. 14).

It should be appreciated that the software components described herein may, when loaded into the CPU 1402 and executed, transform the CPU 1402 and the overall architecture 1400 from a general-purpose computing system into a special-purpose computing system customized to facilitate the functionality presented herein. The CPU 1402 may be constructed from any number of transistors or other discrete circuit elements, which may individually or collectively assume any number of states. More specifically, the CPU 1402 may operate as a finite-state machine, in response to executable instructions contained within the software modules disclosed herein. These computer-executable instructions may transform the CPU 1402 by specifying how the CPU 1402 transitions between states, thereby transforming the transistors or other discrete hardware elements constituting the CPU 1402.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1400 in order to store and execute the software components presented herein. It also should be appreciated that the architecture 1400 may include other types of computing devices, including handheld computers, embedded computer systems, smartphones, PDAs, and other types of computing devices known to those skilled in the art. It is also contemplated that the architecture 1400 may not include all of the components shown in FIG. 14, may include other components that are not explicitly shown in FIG. 14, or may utilize an architecture completely different from that shown in FIG. 14.

Figure 15:
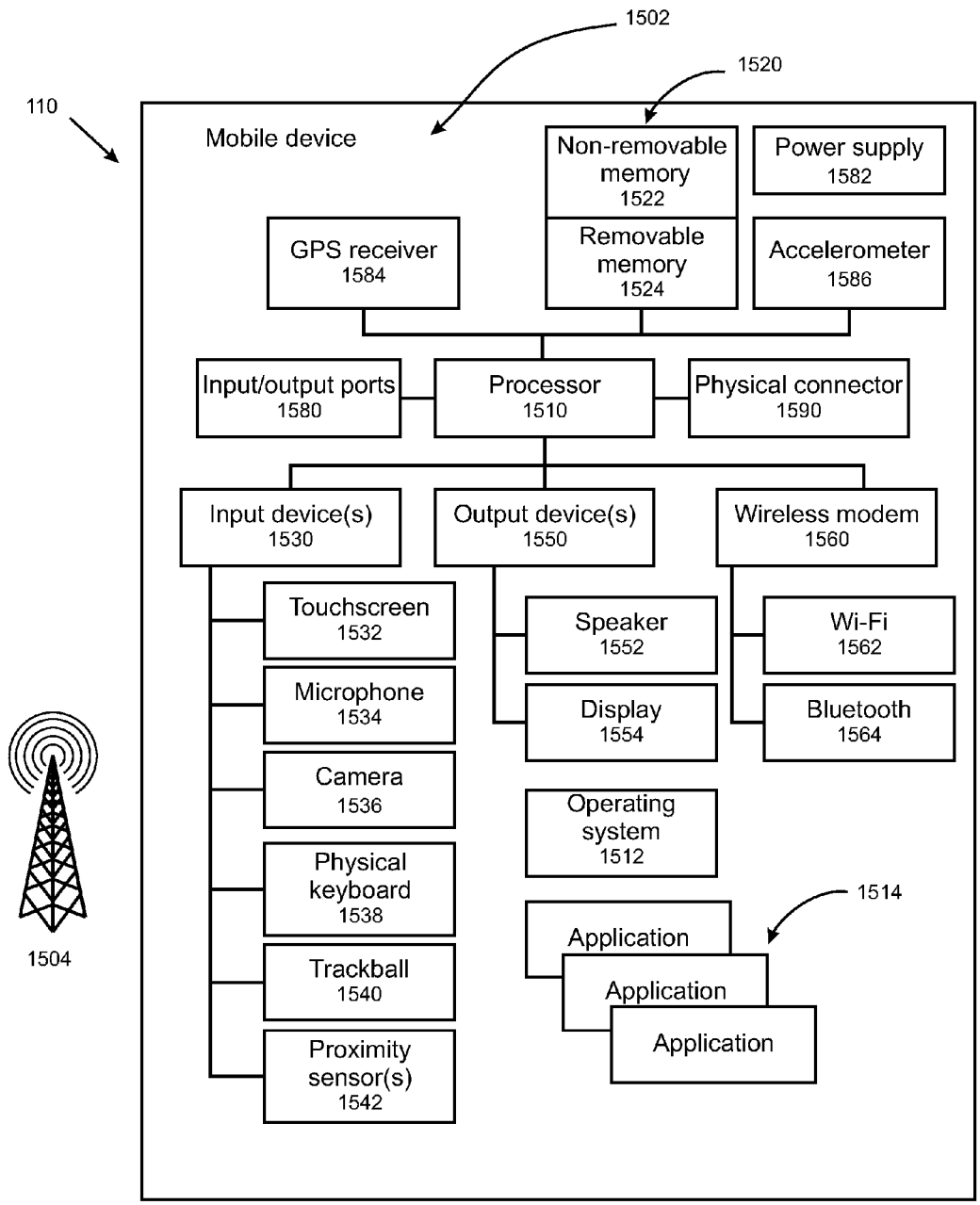
FIG. 15 is a block diagram of an illustrative mobile device.

FIG. 15 is a functional block diagram of an illustrative mobile device 110 such as a mobile phone or smartphone including a variety of optional hardware and software components, shown generally at 1502. Any component 1502 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1504, such as a cellular or satellite network.

The illustrated mobile device 110 can include a controller or processor 1510 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1512 can control the allocation and usage of the components 1502, including power states, above-lock states, and below-lock states, and provides support for one or more application programs 1514. The application programs can include common mobile computing applications (e.g., image-capture applications, email applications, calendars, contact managers, web browsers, messaging applications), or any other computing application.

The illustrated mobile device 110 can include memory 1520. Memory 1520 can include non-removable memory 1522 and/or removable memory 1524. The non-removable memory 1522 can include RAM, ROM, Flash memory, a hard disk, or other well-known memory storage technologies. The removable memory 1524 can include Flash memory or a Subscriber Identity Module (SIM) card, which is well known in GSM (Global System for Mobile communications) systems, or other well-known memory storage technologies, such as "smart cards." The memory 1520 can be used for storing data and/or code for running the operating system 1512 and the application programs 1514. Example data can include web pages, text, images, sound files, video data, or other data sets to be sent to and/or received from one or more network servers or other devices via one or more wired or wireless networks.

The memory 1520 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 1520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 1530; such as a touch screen 1532; microphone 1534 for implementation of voice input for voice recognition, voice commands and the like; camera 1536; physical keyboard 1538; trackball 1540; and/or proximity sensor 1542; and one or more output devices 1550, such as a speaker 1552 and one or more displays 1554. Other input devices (not shown) using gesture recognition may also be utilized in some cases. Other possible output devices (not shown) can include piezoelectric or haptic output devices. Some devices can serve more than one input/output function. For example, touchscreen 1532 and display 1554 can be combined into a single input/output device.

A wireless modem 1560 can be coupled to an antenna (not shown) and can support two-way communications between the processor 1510 and external devices, as is well understood in the art. The modem 1560 is shown generically and can include a cellular modem for communicating with the mobile communication network 1504 and/or other radio-based modems (e.g., Bluetooth 1564 or Wi-Fi 1562). The wireless modem 1560 is typically configured for communication with one or more cellular networks, such as a GSM network for data and voice communications within a single cellular network, between cellular networks, or between the mobile device and a public switched telephone network (PSTN).

The mobile device can further include at least one input/output port 1580, a power supply 1582, a satellite navigation system receiver 1584, such as a Global Positioning System (GPS) receiver, an accelerometer 1586, a gyroscope (not shown), and/or a physical connector 1590, which can be a USB port, IEEE 1394 (FireWire) port, and/or an RS-232 port. The illustrated components 1502 are not required or all-inclusive, as any component can be deleted and other components can be added.

Based on the foregoing, it should be appreciated that technologies for user experiences during call handovers on a hybrid telecommunications network have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed on a mobile device for managing mitigations to an audio disruption occurring during a call handover between different connections to a hybrid telecommunications network, the method comprising:
    determining a type of the audio disruption, the type being based on a time duration of the audio disruption, the type being one of negligible, short, long, or irrecoverable, each type of audio disruption having a successively relatively longer associated time duration when the types are in an order of negligible, short, long, irrecoverable;
    responsively to the determined type of audio disruption, performing one of i) implementing no mitigation on the mobile device, ii) implementing a passive mitigation to the audio disruption including playing background white noise or comfort sounds on the mobile device, or iii) implementing an active mitigation to the audio disruption including playing one or more audio tones on the mobile device; and
    discontinuing any passive mitigation or active mitigation being implemented on the mobile device when the handover is completed and audio is restored.

2. The method of claim 1 in which the active mitigation further comprises displaying an indicator on a graphical user interface (GUI) supported on the mobile device, the indicator usable to inform a user of the mobile device that a handover is in progress.

3. The method of claim 2 in which the indicator comprises one of text only, one or more graphic objects only, or text in combination with one or more graphic objects.

4. The method of claim 2 in which the active mitigation further comprises disabling portions of the GUI so that selected functions of the mobile phone are not capable of invocation by the user.

5. The method of claim 1 further including discontinuing any passive mitigation or active mitigation being implemented on the mobile device when a handover attempt is abandoned and disconnecting the call.

6. The method of claim 5 further comprising providing post-call options on the GUI upon disconnecting the call, the post-call options including one of placing a callback, sending a message, or setting a reminder.

7. A mobile device having connectivity to a hybrid telecommunications network using different types of connections, comprising:
    one or more processors;
    a display that supports a graphical user interface (GUI) for conveying information to a user of the mobile device; and
    a memory device storing computer-readable instructions which, when executed by the one or more processors, cause the mobile device to:
        monitor for audio disruptions occurring in a call carried on the hybrid telecommunications network,
        determine a type of the audio disruption, the type being based on a time duration of the audio disruption, the type being one of negligible, short, long, or irrecoverable, each type of audio disruption having a successively relatively longer associated time duration when the types are in an order of negligible, short, long, irrecoverable,
        play an audio tone on an audio endpoint of the mobile device when the time duration exceeds a first predetermined threshold, the audio tone providing an audio indication to the user that a handover between different connections to the hybrid telecommunications network is in progress, and
        display a message on the GUI of the mobile device when the time duration exceeds a second predetermined threshold, the message providing a visual indication to the user that the handover between different connections to the hybrid telecommunications network is in progress.

8. The mobile device of claim 7 in which the message includes text and one or more graphic objects.

9. The mobile device of claim 8 further including animating either the text or the one or more graphic objects on the GUI.

10. The mobile device of claim 7 further including graying out portions of the GUI when user controls for features of the mobile device associated with the grayed out GUI portions are disabled.

11. The mobile device of claim 7 in which the hybrid telecommunications network comprises loosely coupled network portions, the network portions including at least a mobile operator network portion using cellular and a VoIP (Voice over Internet Protocol) network portion using Wi-Fi and in which one connection type is Wi-Fi and another connection type is cellular.

12. The mobile device of claim 7 in which the audio endpoint is an internal speaker disposed in the mobile device or an external audio device including one of wired or wireless headset, earbud, or earphone.

13. The mobile device of claim 7 in which the first predetermined threshold is approximately 0.5 seconds and the second predetermined threshold is approximately 3 seconds.

14. A method of operating a hybrid network comprising loosely coupled network portions including at least a mobile operator network portion and a VoIP (Voice over Internet Protocol) network portion, the method comprising:
    monitoring a call on the hybrid network for audio disruptions that occur during a call handover from an original connection to the hybrid network to a new connection to the hybrid network, the call handover involving a mobile device used by a local party to the call; and
    implementing a mitigation to the audio disruption for a conventional telephony equipment used by a remote party to the call, the mitigation including providing an audio announcement for playing on the conventional telephony equipment used by the remote party,
    wherein the mitigation is responsive to a type of the audio disruption, the type based on a time duration of the audio disruption and being one of negligible, short, long, or irrecoverable, each type of audio disruption having a successively relatively longer associated time duration when the types are in an order of negligible, short, long, irrecoverable.

15. The method of claim 14 further including determining an audio disruption type, the type being based on a duration of the audio disruption and implementing different mitigations depending on the determined type.

16. The method of claim 14 further including providing audio tones for playing on the conventional telephony equipment used by the remote party.

17. The method of claim 14 further including providing the audio announcement in a repeating loop for playing on the conventional telephony equipment used by the remote party.

18. The method of claim 14 further including disconnecting the local party from the call when a duration of an audio disruption exceeds a threshold and in which the announcement comprises an audio menu that solicits an input from the remote party, the audio menu providing an option to reconnect to the local party or an option to leave a voicemail for the local party.

19. The method of claim 18 further including receiving an input from the remote party in response to the audio menu, the response utilizing DTMF (Dual Tone Multi-Frequency) signaling.

* * * * *